(12) United States Patent  (10) Patent No.: US 8,451,931 B1
Lee et al.  (45) Date of Patent: *May 28, 2013

(54) METHOD AND APPARATUS FOR IMPLEMENTING TRANSMIT DIVERSITY IN OFDM SYSTEMS

(75) Inventors: Jungwon Lee, Cupertino, CA (US);
Jihwan P. Choi, Santa Clara, CA (US);
Hui-Ling Lou, Sunnyvale, CA (US);
Rohit Nabar, Sunnyvale, CA (US);
Yakun Sun, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,949

(22) Filed: Feb. 23, 2012

Related U.S. Application Data (63) Continuation of application No. 12/129,473, filed on May 29, 2008, now Pat. No. 8,130,858.

(60) Provisional application No. 60/940,853, filed on May 30, 2007, provisional application No. 60/942,573, filed on Jun. 7, 2007.

(51) Int. Cl.
*H04B 7/00* (2006.01)

(52) U.S. Cl.
USPC .......................................... 375/267; 375/260

(58) Field of Classification Search
USPC ................. 375/267, 260, 130, 146, 295, 296, 375/299, 347; 455/101, 103, 562.1; 370/208, 370/319, 342, 337
See application file for complete search history.

(56) References Cited

U.S. PATENT DOCUMENTS

| | | | |
|---|---|---|---|
| 8,130,858 B1 * | 3/2012 | Lee et al. | 375/267 |
| 2004/0209579 A1 * | 10/2004 | Vaidyanathan | 455/101 |
| 2005/0237920 A1 * | 10/2005 | Howard et al. | 370/208 |
| 2007/0098097 A1 | 5/2007 | Khan et al. | |
| 2007/0153759 A1 | 7/2007 | Jung et al. | |
| 2008/0080632 A1 * | 4/2008 | Kim et al. | 375/267 |
| 2009/0135940 A1 | 5/2009 | Imamura | |

OTHER PUBLICATIONS

International Standard, ISO/IEC 8802-11, ANSI/IEEE Std 802.11, "Information technology—Telecommunications and information exchange between systems—Local and metropolitan area networks—Specific requirements, Part 11: Wireless LAN Medium Access Control (MAC) and Physical Layer (PHY) specifications," *The Institute of Electrical and Electronics Engineers, Inc.* (1999).
S. A. Mujtaba, "IEEE P802.11—Wireless LANS, TGn Sync Proposal Technical Specification," *The Institute of Electrical and Electronics Engineers, Inc.*, doc.: IEEE 802.11-04/889r6, May 2005.

(Continued)

*Primary Examiner* — Khai Tran (57) ABSTRACT

A plurality of diagonal matrices $C_i$ is determined, where the plurality of diagonal matrices $C_i$ is for modifying a plurality of transmit signals to be transmitted via a plurality of transmit antennas, each diagonal matrix $C_i$ for modifying an i-th block of sub-carriers, adjacent in frequency, in the plurality of transmit signals. The plurality of diagonal matrices $C_i$ is used to modify the plurality of transmit signals to implement transmit diversity.

20 Claims, 6 Drawing Sheets

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.* (1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institue of Electrical and Electronics Engineers, Inc.*, Apr. 1, 2003.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institue of Electrical and Electronics Engineers, Inc.*, Nov. 7, 2001.

* cited by examiner

METHOD AND APPARATUS FOR IMPLEMENTING TRANSMIT DIVERSITY IN OFDM SYSTEMS

CROSS-REFERENCES TO RELATED APPLICATIONS

The present application is a continuation application of U.S. application Ser. No. 12/129,473, now U.S. Pat. No. 8,130,858, entitled "METHOD AND APPARATUS FOR IMPLEMENTING TRANSMIT DIVERSITY IN OFDM SYSTEMS," filed on May 29, 2008, which claims the benefit of U.S. Provisional Application No. 60/940,853, entitled "OFDM Transmit Diversity Scheme for Receivers with Cluster-Based Channel Estimation," filed on May 30, 2007, and which also claims the benefit of U.S. Provisional Application No. 60/942,573, entitled "Cluster-Based Transmit Diversity Scheme for OFDM Systems," filed on Jun. 6, 2007. All of the above-mentioned patent applications are hereby incorporated by reference herein in their entireties.

FIELD OF TECHNOLOGY

The present disclosure relates generally to wireless communication systems and, more particularly, to an apparatus and method for implementing transmit diversity in a transmitter with multiple antennas.

DESCRIPTION OF THE RELATED ART

An ever-increasing number of relatively inexpensive, low power wireless data communication services, networks and devices have been made available over the past number of years, promising near wire speed transmission and reliability. Various wireless technology is described in detail in the 802.11 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the signal-to-noise ratio (SNR) of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

Diversity in a communication system refers to the use of multiple communication channels having different characteristics. Diversity can help mitigate fading and co-channel interference. For instance, different channels typically experience different levels of fading and/or interference. Diversity can be implemented when multiple versions of the same signal are transmitted and/or received and then combined in the receiver. Thus, reception can be improved by transmitting a single signal using multiple transmit antennas while phasing (and amplifying) this signal as it is provided to the various transmit antennas and exploiting the resulting transmit diversity. One transmit diversity technique that may be utilized is often referred to as cyclic delay diversity (CDD). In CDD, the same signal is applied to multiple transmit antennas, but a different time delay is introduced in the time domain signal for each antenna. For example, a first antenna may have a time delay of zero, a second antenna may have a time delay of $t_1$, and a third antenna may have a time delay of $t_2$, where $t_1$ and $t_2$ are selected time delay values. As is known, CDD may also be implemented in the frequency domain. For instance, multiple signals corresponding to the multiple antennas may be generated by multiplying the original signal with respective complex exponential functions corresponding to the different antennas. Each complex exponential function has a phase that linearly changes with frequency, and the slope at which the phase changes is different as compared to the slopes corresponding to the other antennas.

Additionally, each receiver of the wireless communication system may periodically develop an equalizer matrix that, when applied to the received signal, attempts to reverse the effects of the channel. Developing the equalizer matrix may include developing an estimate of the channel, and then using the estimate of the channel to generate the equalizer coefficients. Channel estimation may involve transmitting known training symbols, receiving the transmitted training symbols, and processing the received training symbols to estimate the channel. The estimation may be based on differences between the known training symbols and the received training symbols. In OFDM system, there may be multiple equalizer matrices, each for a different OFDM sub-band.

SUMMARY

In one embodiment, a method includes determining a plurality of diagonal matrices $C_i$ for modifying a plurality of transmit signals to be transmitted via a plurality of transmit antennas, each diagonal matrix $C_i$ for modifying an i-th block of sub-carriers, adjacent in frequency, in the plurality of transmit signals. The method also includes using the plurality of diagonal matrices $C_i$ to modify the plurality of transmit signals to implement transmit diversity.

In another embodiment, a communication device comprises a hardware device configured to determine a plurality of diagonal matrices $C_i$ for modifying a plurality of transmit signals to be transmitted via a plurality of transmit antennas, each diagonal matrix $C_i$ for modifying an i-th block of sub-carriers, adjacent in frequency, in the plurality of transmit signals, and use the plurality of diagonal matrices $C_i$ to modify the plurality of transmit signals to implement transmit diversity.

DETAILED DESCRIPTION

While the transmit diversity techniques described herein for processing and effecting a wireless data transmission are described as being used in communication systems that operate according to the IEEE Standard 802.16 communication standard, these techniques may be used in various other types of wireless communication systems such as the IEEE Standard 802.11a/g/n communication standards. More generally, these techniques may be utilized in a wireless communication system that utilizes OFDM modulation in conjunction with multiple transmit antennas, and the techniques are not limited to systems conforming to one or more of the IEEE Standard 802.11x and 802.16 standards.

Figure 1:
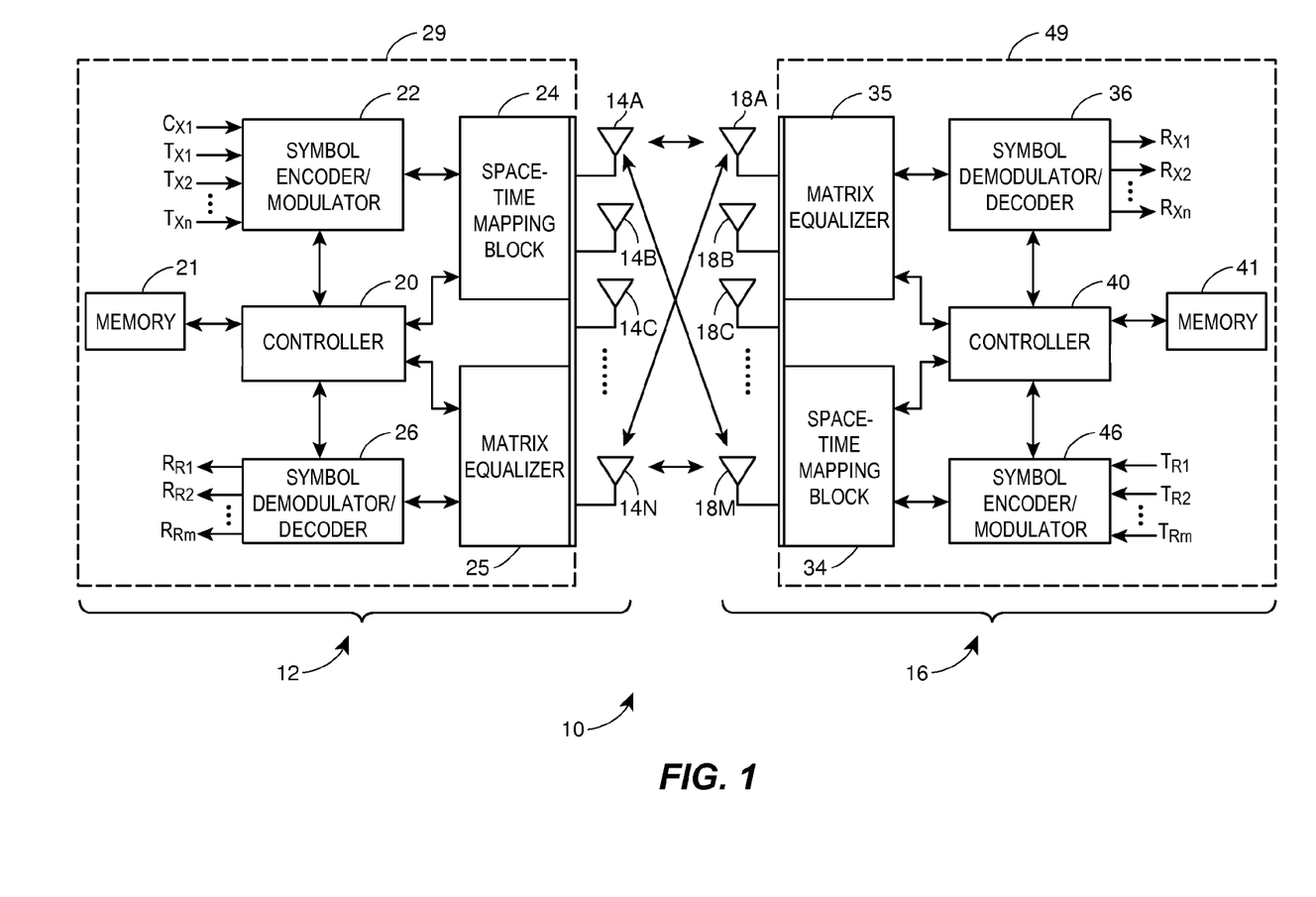
FIG. 1 is a block diagram of a wireless MIMO communication or transmission system that implements transmit diversity techniques.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24. The transmitter 12 may also include a matrix equalizer 25 and a symbol demodulator and decoder unit 26 to perform demodulation and decoding of signals received via the antennas 14A-14N in a receive mode. The controller 12 may be any desired type of controller and may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be a sounding packet, one or more fields in a preamble, etc.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. Upon receiving the modulated signals, the space-time mapping block 24 or beamforming network processes the modulated signals by injecting delays and/or gains into the modulated signals. As will be described in more detail below, the space-time mapping block 24 may process the sub-carriers in blocks. For example, within a block, the space-time mapping block 24 may apply the same phase to all of the sub-carriers of the block for a signal corresponding to one of the antennas 14A-14N. On the other hand, the space-time mapping block 24 may apply different phases to different blocks of sub-carriers. While not specifically shown in FIG. 1, the modulated symbol streams may be up-converted to the radio frequency (RF) carrier frequencies associated with an OFDM technique (in one or more stages) before or after being processed by the space-time mapping block 24.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (e.g., sounding packet, preamble fields, etc.). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$. More particularly, the matrix equalizer 35 may process the test or control signal $C_{x1}$ to develop an equalizer matrix that, when applied to the received signal, attempts to reverse the effects of the channel.

As shown in FIG. 1, the receiver 16 may also include a memory 41 and a symbol encoder and modulator unit 46 which may receive one or more signals $T_{R1}$-$T_{Rn}$, which may be encoded and modulated using any desired encoding and modulation techniques. The encoded and modulated symbol stream may then be upconverted and processed by a space-time mapping block 34, prior to being transmitted via the receiver antennas 18A-18N to, for example, the transmitter 12, thereby implementing the reverse link. The space-time mapping block 34 may operate in a manner the same as or similar to the space-time mapping block 24. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may develop and apply an equalizer matrix to enhance the separation and therefore the reception of the various signals transmitted by the antennas 18A-18M. As noted above, the CSI, programs and channel estimates used by the equalizers 25, 35 may be stored in the memories 21 and 41.

Cyclic delay diversity (CDD) is a diversity technique that may be implemented by the space-time mapping block 24 and/or the space-time mapping block 34. But CDD increases the delay spread D of the effective channel impulse response by the maximum difference in the cyclic delay values:

$$D = \max|d_i - d_j| \qquad \text{(Equation 1)}$$

for all i and j transmit antennas, where $d_x$ is the delay applied to antenna x. Increasing the delay spread of the effective channel impulse response introduces frequency selectivity. With a communication scheme that utilizes a sparse pilot pattern, performance may degrade as frequency selectivity increases. In particular, as the frequency selectivity introduced by CDD increases and, channel estimates become less accurate with a sparse pilot pattern. In turn, less accurate channel estimates may result in poorer equalization and a loss in performance.

Figure 2:
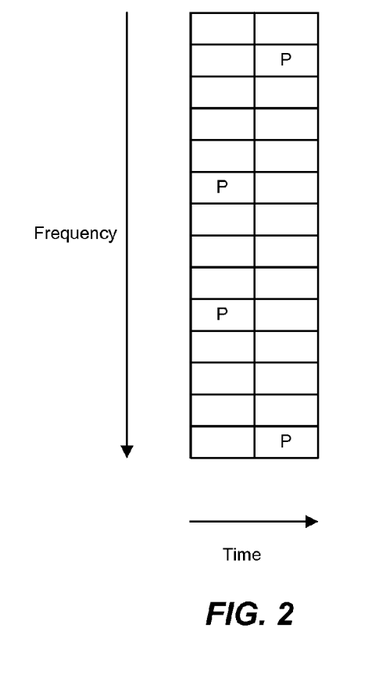
FIG. 2 is a block diagram of a cluster of sub-carriers in the IEEE 802.16 standard.

Channel estimates can be block-based. For example, a channel estimate can be determined for a block of sub-carriers based on sub-carriers within the block and not based on sub-carriers outside of the block. A block of sub-carriers may be a set of sub-carriers consecutive in terms of frequency. A block optionally may extend over time to encompass multiple OFDM symbols. When an OFDM system employs pilots, there may be relatively few pilots within a block as compared to all the pilots in an OFDM symbol. One example of block-based channel estimation is utilized in the IEEE 802.16 standard and is referred to as cluster-based channel estimation. FIG. 2 is a diagram illustrating a cluster of sub-carriers for a partial usage of sub-carriers (PUSC) zone according to the IEEE 802.16 standard. Each block represents a sub-carrier in an OFDM symbol. Additionally, blocks with denoted "P" indicate a pilot. In the example of FIG. 2, the cluster includes 14 sub-carriers spanning two OFDM symbols. Channel estimation for the cluster of FIG. 2 includes linear interpolation (and extrapolation) over two pilot sub-carriers in a given symbol and weighted averaging over time.

Generally, a practical transmit diversity scheme may seek to maximize frequency diversity when the channel is known to the receiver. On the other hand, it is generally desirable for the transmit diversity scheme to be transparent to the receiver with respect to channel estimation. But as discussed above, increasing frequency diversity tends to decrease the accuracy of channel estimation. Put another way, a transmit diversity scheme may seek to maximize cyclic delay, whereas channel estimation performance increases as cyclic delay decreases.

A new block-based transmit diversity technique is described below. In this technique, a same phase is applied to all sub-carriers in a block, and different phases are applied to adjacent (in terms of frequency) blocks. In this technique, frequency diversity between blocks is provided, whereas frequency diversity within a block is minimized (with respect to frequency diversity caused by the transmit diversity technique as opposed to the frequency selectivity caused by the channel). By minimizing frequency diversity/selectivity within a block, the transmit diversity scheme may be more transparent to block-based channel estimation by the receiver as compared to CDD. It is to be understood, that the block partitioning utilized for transmit diversity need not be the same as the block partitioning utilized for channel estimation. In other words, the transmit diversity blocks may be the same as or different than the channel estimation blocks.

The new block-based transmit diversity technique will now be described in more detail. The communication system can be modeled as:

$$y[k] = H[k]x[k] + z[k] \qquad \text{(Equation 2)}$$

or $$\begin{bmatrix} y_1[k] \\ y_2[k] \\ \vdots \\ y_{N_R}[k] \end{bmatrix} = \qquad \text{(Equation 3)}$$

$$\begin{bmatrix} H_{1,1}[k] & H_{1,2}[k] & \ldots & H_{1,N_T}[k] \\ H_{2,1}[k] & H_{2,2}[k] & \ldots & H_{2,N_T}[k] \\ \vdots & \vdots & & \vdots \\ H_{N_R,1}[k] & H_{N_R,2}[k] & \ldots & H_{N_R,N_T}[k] \end{bmatrix} \begin{bmatrix} x_1[k] \\ x_2[k] \\ \vdots \\ x_{N_T}[k] \end{bmatrix} + \begin{bmatrix} z_1[k] \\ z_2[k] \\ \vdots \\ z_{N_R}[k] \end{bmatrix}$$

or $$y[k] = [h_1[k]h_2[k] \ldots h_{N_T}[k]]x[k] + z[k] \qquad \text{(Equation 4)}$$

where:
$N_T$: number of transmit antennas;
$N_R$: number of receive antennas;
$x[k] \in C^{N_T \times 1}$: transmit signal vector for sub-carrier k;
$H[k] \in C^{N_R \times N_T}$: channel matrix for sub-carrier k;
$h_t[k] \in C^{N_R \times 1}$: t-th column of channel matrix $H[k]$;
$z[k] \in C^{N_R \times 1}$: noise vector for sub-carrier k; and
$y[k] \in C^{N_R \times 1}$: receive signal vector for sub-carrier k.

The transmit signal vector $x[k]$ can be generated from a data signal and pre-coding information:

$$x[k] = A[k]u[k] \qquad \text{(Equation 5)}$$

where:
$u[k] \in C^{N_S \times 1}$: data vector for sub-carrier k;
$A[k] \in C^{N_T \times N_S}$: any pre-coding matrix for sub-carrier k;
$N_S$: number of streams; and
$N_T$: number of transmit antennas.
If there is only one stream, then $A[k]$ becomes $a[k]$, an $N_T \times 1$ pre-coding vector.

In this case, Equation 2 can be rewritten as:

$$y[k] = \left( \sum_{t=1}^{N_T} a_t[k]h_t[k] \right) u[k] + z[k] \qquad \text{(Equation 6)}$$

Additionally, the pre-coding matrix can be partitioned into two matrices, which include a diagonal matrix:

$$A[k] = C[k]W[k] \qquad \text{(Equation 7)}$$

where:
$C[k] = \text{diag}([c_1[k] \; c_2[k] \ldots c_{N_T}[k]])$, which is a diagonal pre-coding matrix for sub-carrier k (with $c_i[k]$ the i-th diagonal component) that may change the magnitude and/or phase of the signal applied to each transmit antenna;
$W[k] \in C^{N_T \times N_S}$: a stream-to-transmit antenna mapping matrix for sub-carrier k.

In general, W[k] may be any suitable stream-to-transmit antenna mapping matrix. As a specific example, the matrix W[k] may be any unitary matrix with every element having the same magnitude, such as a Hadamard matrix or a Fourier matrix.

In one implementation of block-based transmit diversity, the same magnitude and phase can be used for all sub-carriers in a block. In this implementation, the diagonal pre-coding matrix C[k] can be written as:

$$C[k] = C_i = \text{diag}([\beta_{1,i} e^{j\theta_{1,i}} \; \beta_{2,i} e^{j\theta_{2,i}} \; ... \; \beta_{N_T,i} e^{j\theta_{N_T,i}}]) \quad \text{(Equation 8)}$$

for $k \in K_i$, where i is an index indicating the i-th block of sub-carriers, $K_i$ is the set of sub-carriers in the i-th block of sub-carriers, $C_i$ is the diagonal matrix C[k] to be applied to all sub-carriers in the i-th block, $\beta_{t,i}$ is the magnitude applied for the t-th transmit antenna for the i-th block, and $\theta_{t,i}$ is the phase applied to the t-th transmit antenna for the i-th block. Thus, the same magnitude $\beta_{t,i}$ is applied to all sub-carriers $k \in K_i$ for the t-th antenna. Similarly, the same phase $\theta_{t,i}$ is applied to all sub-carriers $k \in K_i$ for the t-th antenna.

If there is one stream, Equations 6, 7 and 8 can be combined:

$$y[k] = \left( \sum_{t=1}^{N_T} \beta_{t,i} e^{j\theta_{t,i}} h_t[k] \right) u[k] + z[k] \quad \text{(Equation 9)}$$

for $k \in K_i$.

If unit magnitude is applied for all sub-carrier and all antennas, Equation 8 can be simplified:

$$C[k] = C_i = \text{diag}([e^{j\theta_{1,i}} \; e^{j\theta_{2,i}} \; ... \; e^{j\theta_{N_T,i}}]) \quad \text{(Equation 10)}$$

for $k \in K_i$. If there is one stream, Equation 9 can be rewritten:

$$y[k] = \left( \sum_{t=1}^{N_T} e^{j\theta_{t,i}} h_t[k] \right) u[k] + z[k] \quad \text{(Equation 11)}$$

for $k \in K_i$.

One example general criterion for selection of the diagonal pre-coding matrices $C_i$ will now be described. A coherence bandwidth B, with units of blocks, may be defined as a bandwidth including B blocks over which the channel remains relatively uniform. The matrices $C_i$ for the B blocks may be chosen (i.e., the phases $\theta_{t,i}$ and the magnitudes $\beta_{t,i}$) so that they span uniformly a sphere in an $N_T$-dimensional complex space. Additionally, the matrices $C_i$ may be chosen so that matrices $C_i$ corresponding to adjacent blocks are spaced relatively far apart on the sphere.

Figure 3:
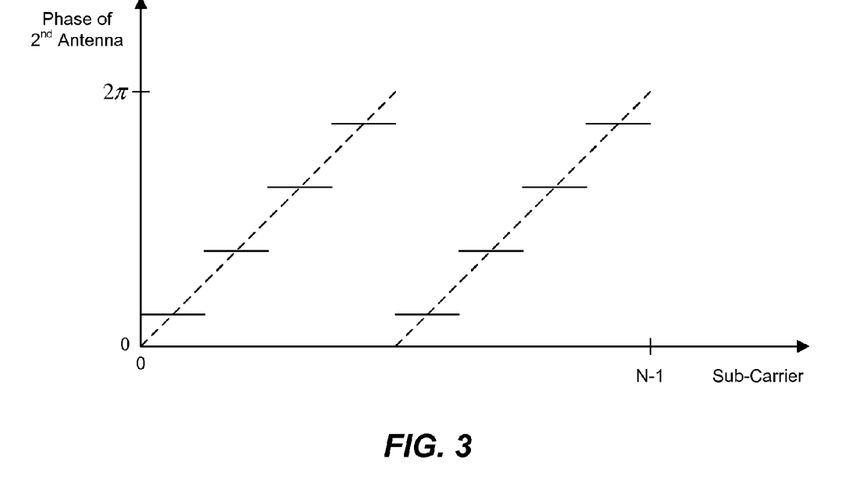
FIG. 3 is graph of phases applied to blocks of sub-carriers in a transmit diversity technique.

In one specific implementation, the phase for a given block may be selected to be the average of the phases that would be applied to the sub-carriers within the block if the CDD technique were employed. FIG. 3 is a graph showing phases that could be applied to signals provided to a second antenna of a transmitter. The dashed lines indicate phases that could be applied by the CDD technique. In particular, with the CDD technique, the phase varies linearly as the sub-carriers increase in frequency (i.e., as the index k increases). The solid horizontal lines indicate phases that can be applied with a block-based transmit diversity technique. Each horizontal line corresponds to a block of sub-carriers. As can be seen in FIG. 3, a single phase is applied to all sub-carriers within a block, whereas the phases applied to different blocks varies. In the example of FIG. 3, the phase applied to each block is the average of phases that would have been applied if the CDD technique were employed. Additionally, in the example of FIG. 3, it can be seen that the phases are not chosen so that adjacent blocks have phases that are relatively far apart.

In another implementation, the phases to be applied to the blocks are only selectable from the set $$0, \frac{\pi}{2}, \pi, \text{ and } \frac{3\pi}{2}.$$

In such an implementation, the components of the matrices $C_i$ will only be $\pm 1$ and $\pm j$. As is known, multiplication by $\pm 1$ and $\pm j$ are easily implemented. Thus, applying matrices $C_i$ with only elements of $\pm 1$ and $\pm j$ may require much less hardware as compared to hardware for applying matrices with more generally complex valued elements.

Optionally, the diagonal pre-coding matrices $C_i$ may be selected so that phases generally abruptly change between adjacent blocks of sub-carriers. As one specific example in which there are two transmit antennas, one stream, and the coherent bandwidth is four blocks, the phases may chosen as:

$$\theta_{1,i} = 0, \text{ for all } i; \text{ and}$$

$$[\theta_{2,4n+1} \; \theta_{2,4n+2} \; \theta_{2,4n+3} \; \theta_{2,4n+4}] = \left[0 \; \pi \; \frac{\pi}{2} \; \frac{3\pi}{2}\right], \text{ for all } n,$$

where $\theta_{1,i}$ is the phase applied to i-th block in the signal for the first antenna, and $\theta_{2,i}$ is the phase applied to i-th block in the signal for the second antenna, where i varies from 1 to N, where N is the number of sub-carriers.

Optionally, selection of the diagonal pre-coding matrices $C_i$ may be based on the type of block-based channel estimation to be utilized. For example, if channel estimation for a given sub-carrier utilizes adjacent OFDM symbols in the same block, it may be desirable to not vary the phase of the block over time, or to vary the phase slowly. As another example, if channel estimation for a given sub-carrier does not utilize adjacent OFDM symbols in the same block, or if channel estimation is performed super-symbol by super-symbol, then it may be desirable to drastically change the phase over time.

As yet another option, the matrices $C_i$ may be selected so that magnitudes randomly or pseudo-randomly vary between blocks, but magnitudes remain constant within each block. Of course, the magnitudes could be varied in other ways as well. Moreover, as discussed above, the magnitudes may be kept uniform amongst the blocks.

The transmit diversity techniques described herein may be implemented in a transmitter such as the devices 12 and 16 of FIG. 1. For example, the matrices $C_i$ may be determined by the space-time mapping block 24, the controller 20 or any other block of the transmitter 12. For example, a transmit diversity phase determination block may determine a set of phases that corresponds to each of the matrices $C_i$. The transmit diversity phase determination block could be a component of the space-time mapping block 24 or any other component of the transmitter 12 illustrated in FIG. 1. Of course, the transmit diversity phase determination block could be separate from components illustrated in FIG. 1. As another example, a transmit diversity magnitude determination block may determine a set of magnitudes that corresponds to each of the matrices $C_i$. The transmit diversity magnitude determination block could be a component of the space-time mapping block 24 or any other component of the transmitter 12 illustrated in FIG. 1. Of course, the transmit diversity magnitude determination block could be separate from components illustrated in FIG. 1. The matrices $C_i$ may be stored in the memory 21 (which may include merely storing the diagonal components of the matrices $C_i$ in the memory 21). Optionally, the space-time mapping block 24 may include a memory and the memory of the space-time mapping block 24. Of course, the matrices $C_i$ may be stored in any other memory of the transmitter 12. The matrices $C_i$ may be applied by the space-time mapping block 24.

Figure 4:
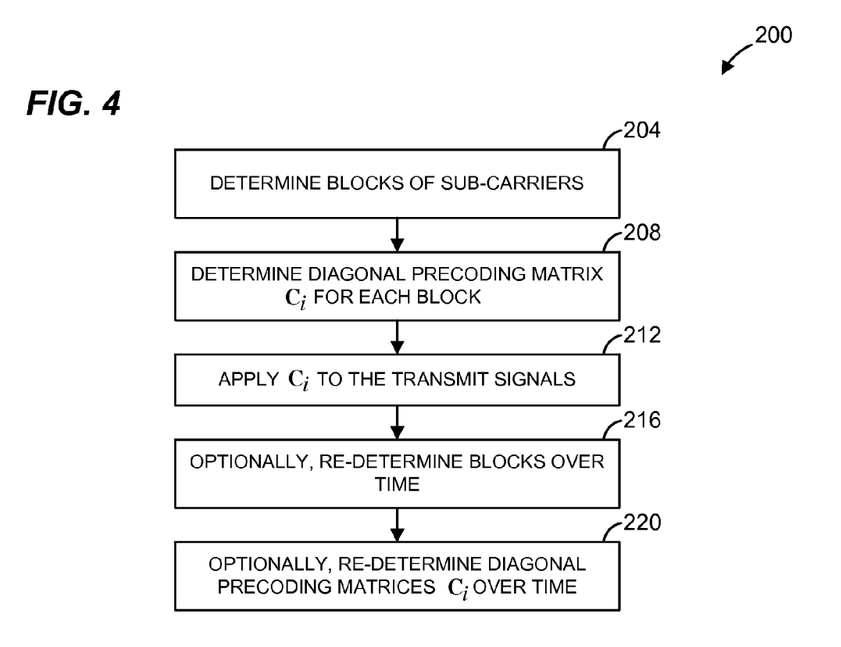
FIG. 4 is a flow diagram of one example method for implementing transmit diversity.

FIG. 4 is a flow diagram of an example method 200 for implementing transmit diversity in an OFDM system. The method 200 may be implemented by a device such as the transmitter 12 and/or the receiver 16 of FIG. 1, and will be described with reference to FIG. 1 for ease of explanation. Of course, the method 200 may be implemented by a communication device other than the transmitter 12 and the receiver 16 of FIG. 1. Similarly, the transmitter 12 and the receiver 16 may implement a transmit diversity method different than the method 200.

At a block 204, blocks of sub-carriers in an OFDM system may be determined. As discussed above, each block includes a set of consecutive (in frequency) sub-carriers. The blocks may be determined outside of the transmitter 12, for example, and the transmitter 12 may be pre-configured to handle the pre-determined blocks. As an illustrative example, it may be determined ahead of time that the device 12 is to be used in conjunction with a particular communication standard, and it may be predetermined that the sub-carriers in the communication standard will be partitioned into a set of blocks for purposes of transmit diversity. For instance, the blocks may be determined such that each block includes the same number of sub-carriers. The device 12 may be preconfigured with the predetermined blocks. On the other hand, the device 12 may dynamically determine the blocks. As just one example, the blocks could be determined by the device 12 based on a channel estimation, such that the channel in each block remains relatively unchanged. The space-time mapping block 24, the controller 20 or any other block of the transmitter 12 may dynamically determine the blocks. On the other hand, if the blocks are pre-determined, the space-time mapping block 24, the controller 20 or any other block of the transmitter 12 may be pre-configured with knowledge of the pre-determined blocks. For example, an indication of the pre-determined blocks may be stored in the memory 21 or any other memory of the device 12. A transmit diversity sub-carrier partitioning block may dynamically determine the blocks. The transmit diversity sub-carrier partitioning block could be a component of the space-time mapping block 24 or any other component of the transmitter 12 illustrated in FIG. 1. Of course, the transmit diversity sub-carrier partitioning block could be separate from components illustrated in FIG. 1.

At a block 208, the diagonal pre-coding matrices $C_i$ may be determined in a manner such as described above. The space-time mapping block 24, the controller 20 or any other block of the transmitter 12 may determine the diagonal pre-coding matrices $C_i$. For example, the diagonal pre-coding matrices $C_i$ may be stored in the memory 21 or any other memory of the device 12.

At a block 212, the pre-coding matrices $C_i$ may be applied to the signals to be transmitted via the antennas 14A-N. For instance, the space-time mapping block 24 may apply the pre-coding matrices $C_i$. At a block 216, the blocks optionally may be re-determined one or more subsequent times. For example, if the device 12 determines that the channel has changed, the blocks may be re-determined. As another example, the blocks may be re-determined periodically. At a block 220, the diagonal pre-coding matrices $C_i$ may be re-determined one or more subsequent times. For example, if the device 12 determines that the channel has changed, the diagonal pre-coding matrices $C_i$ may be re-determined. As another example, the diagonal pre-coding matrices $C_i$ may be re-determined periodically. As yet another example, the diagonal pre-coding matrices $C_i$ may be re-determined each time the blocks are re-determined.

Of course, the transmit diversity techniques described herein may be implemented in a device different than the devices 12 and 16 of FIG. 1. More generally, transmit diversity techniques such as described above may be utilized in various MIMO devices that utilize OFDM modulation. For example, techniques such as described above may be utilized in base stations, access points, wireless routers, etc. Additionally, FIGS. 5A-5F illustrate various devices in which transmit diversity techniques such as described above, may be employed.

Figure 5A:
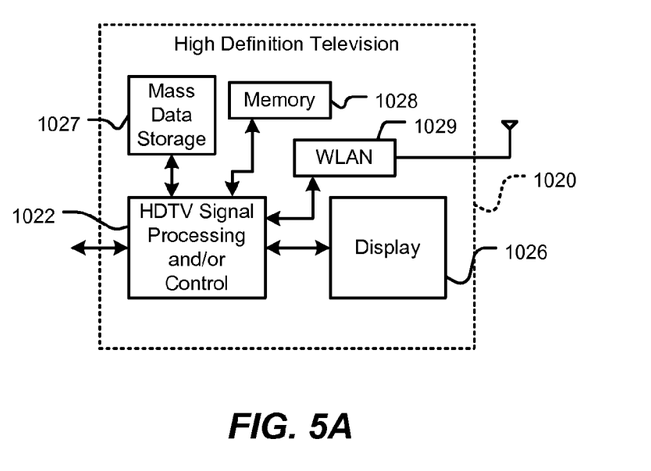
FIG. 5A is a block diagram of a high definition television that may utilize transmit diversity techniques such as described herein.

Referring now to FIG. 5A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required. The signal processing and/or control circuit 1022 may implement transmit diversity techniques such as described above.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement transmit diversity techniques such as described above.

Figure 5B:
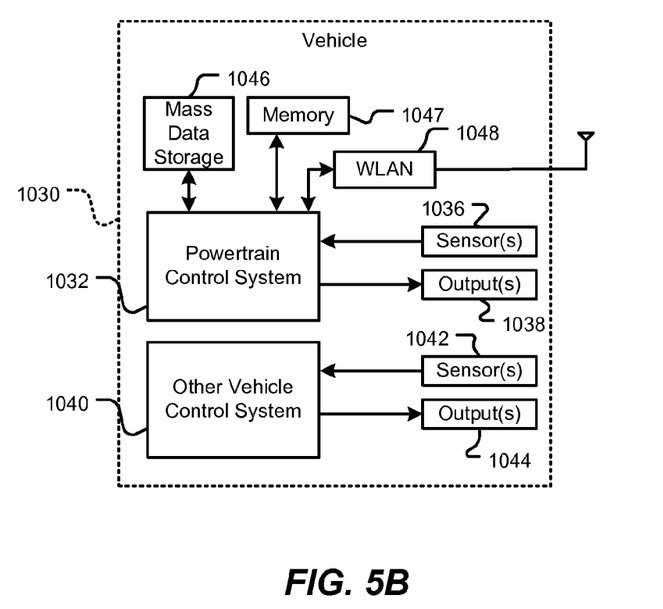
FIG. 5B is a block diagram of a vehicle that may utilize transmit diversity techniques such as described herein.

Referring now to FIG. 5B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement transmit diversity techniques such as described above.

Figure 5C:
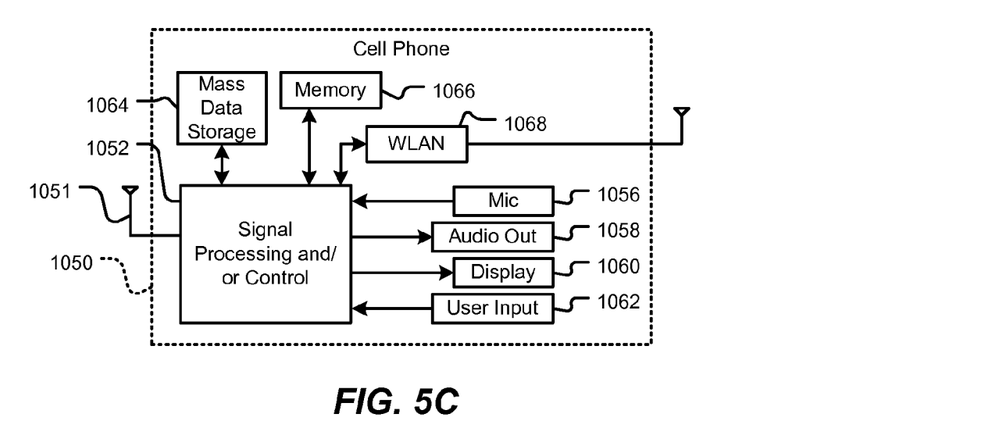
FIG. 5C is a block diagram of a cellular phone that may utilize transmit diversity techniques such as described herein.

Referring now to FIG. 5C, such techniques may be used in a cellular phone 1050 that may include a cellular antenna 1051. The cellular phone 1050 may include either or both signal processing and/or control circuits, which are generally identified in FIG. 5C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement transmit diversity techniques such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement transmit diversity techniques such as described above.

Figure 5D:
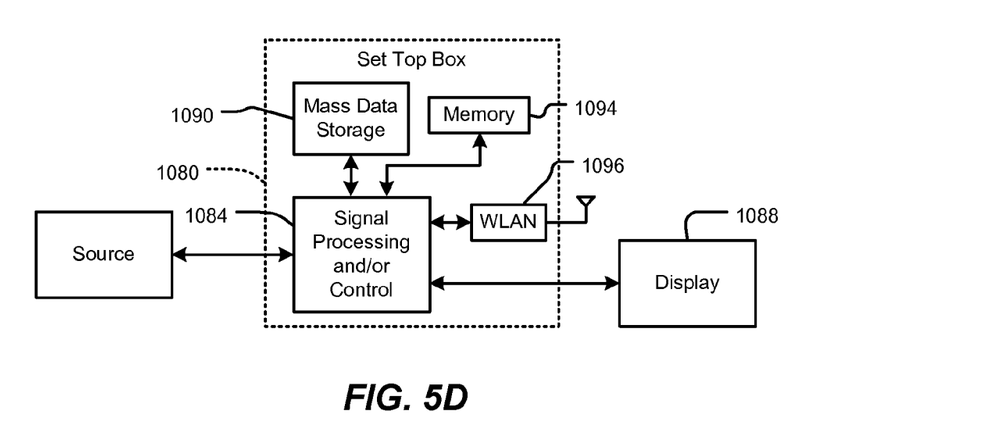
FIG. 5D is a block diagram of a set top box that may utilize transmit diversity techniques such as described herein.

Referring now to FIG. 5D, such techniques may be utilized in a set top box 1080. The set top box 1080 may include either or both signal processing and/or control circuits, which are generally identified in FIG. 5D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement transmit diversity techniques such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement transmit diversity techniques such as described above.

Figure 5E:
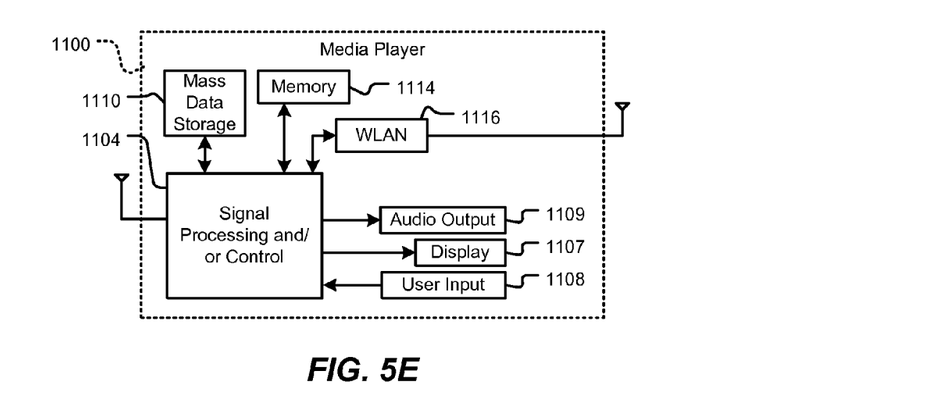
FIG. 5E is a block diagram of a media player that may utilize transmit diversity techniques such as described herein.

Referring now to FIG. 5E, such techniques may be used in a media player 1100. The media player 1100 may include either or both signal processing and/or control circuits, which are generally identified in FIG. 5E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement transmit diversity techniques such as described above.

Figure 5F:
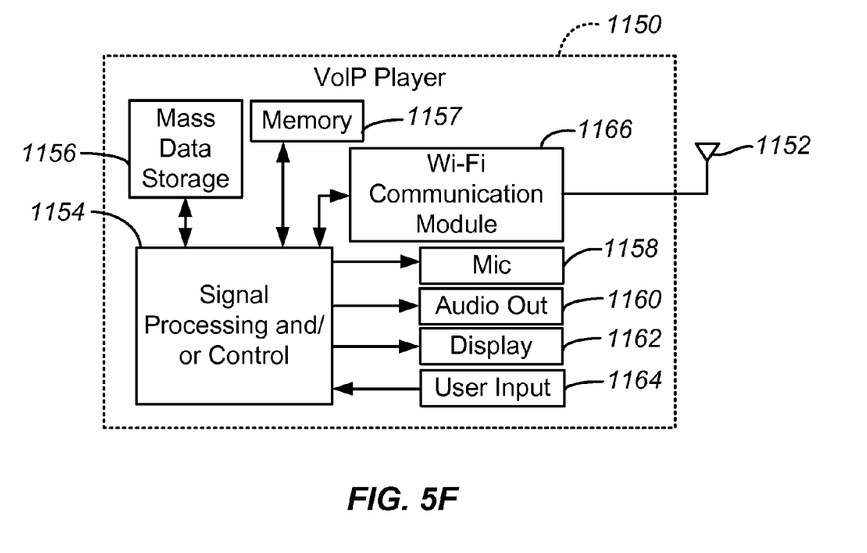
FIG. 5F is a block diagram of a voice over IP device that may utilize matrix transmit diversity techniques such as described herein.

Referring to FIG. 5F, such techniques may be utilized in a Voice over Internet Protocol (VoIP) phone 1150 that may include an antenna 1152. The VoIP phone 1150 may include either or both signal processing and/or control circuits, which are generally identified in FIG. 5F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166.

The WiFi communication module 1166 may implement transmit diversity techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
    determining a plurality of diagonal matrices $C_i$ for modifying a plurality of transmit signals to be transmitted via a plurality of transmit antennas, each diagonal matrix $C_i$ for modifying an i-th block of sub-carriers, adjacent in frequency, in the plurality of transmit signals; and
    using the plurality of diagonal matrices $C_i$ to modify the plurality of transmit signals to implement transmit diversity.

2. The method of claim 1, wherein determining the plurality of diagonal matrices $C_i$ comprises selecting phases for inclusion in the plurality of diagonal matrices $C_i$ from a set of phases that are uniformly spaced between 0 and $2\pi$.

3. The method of claim 2, wherein the set of phases is $$\left[0 \quad \pi \quad \frac{\pi}{2} \quad \frac{3\pi}{2}\right].$$

4. The method of claim 1, wherein determining the plurality of diagonal matrices $C_i$ comprises determining each diagonal element of each diagonal matrix $C_i$ to have a unit magnitude.

5. The method of claim 1, wherein determining the plurality of diagonal matrices $C_i$ comprises determining magnitudes of diagonal elements of the plurality of diagonal matrices $C_i$ that vary from diagonal matrix to diagonal matrix.

6. The method of claim 5, wherein determining the plurality of diagonal matrices $C_i$ comprises determining magnitudes of diagonal elements of the plurality of diagonal matrices $C_i$ that vary pseudo-randomly from diagonal matrix to diagonal matrix.

7. The method of claim 1, wherein determining the plurality of diagonal matrices $C_i$ comprises determining (a) for each i and (b) for each diagonal element of $C_i$, a magnitude and phase pair corresponding to a respective transmit antenna.

8. The method of claim 7, wherein the plurality of diagonal matrices $C_i$ are determined so that the plurality of diagonal matrices $C_i$ uniformly span a sphere in an $N_T$-dimensional complex space, wherein $N_T$ is the number of transmit antennas in the plurality of transmit antennas.

9. The method of claim 1, further comprising using a plurality of stream-to-transmit antenna mapping matrices to modify the plurality of transmit signals.

10. The method of claim 9, further comprising combining each stream-to-transmit antenna mapping matrix with a corresponding diagonal matrix $C_i$ to generate a plurality of precoding matrices;
    wherein using the plurality of diagonal matrices $C_i$ to modify the plurality of transmit signals and using the plurality of stream-to-transmit antenna mapping matrices to modify the plurality of transmit signals comprises using the plurality of precoding matrices to modify the plurality of transmit signals.

11. A communication device, comprising:
    a hardware device configured to
        determine a plurality of diagonal matrices $C_i$ for modifying a plurality of transmit signals to be transmitted via a plurality of transmit antennas, each diagonal matrix $C_i$ for modifying an i-th block of sub-carriers, adjacent in frequency, in the plurality of transmit signals, and
        use the plurality of diagonal matrices $C_i$ to modify the plurality of transmit signals to implement transmit diversity.

12. The apparatus of claim 11, wherein the hardware device is configured to select phases for inclusion in the plurality of diagonal matrices $C_i$ from a set of phases that are uniformly spaced between 0 and $2\pi$.

13. The apparatus of claim 12, wherein the set of phases is $$\left[0 \quad \pi \quad \frac{\pi}{2} \quad \frac{3\pi}{2}\right].$$

14. The apparatus of claim 11, wherein the hardware device is configured to determine each diagonal element of each diagonal matrix $C_i$ to have a unit magnitude.

15. The apparatus of claim 11, wherein the hardware device is configured to determine magnitudes of diagonal elements of the plurality of diagonal matrices $C_i$ that vary from diagonal matrix to diagonal matrix.

16. The apparatus of claim 15, wherein the hardware device is configured to determine magnitudes of diagonal elements of the plurality of diagonal matrices $C_i$ that vary pseudo-randomly from diagonal matrix to diagonal matrix.

17. The apparatus of claim 11, wherein the hardware device is configured to determine (a) for each i and (b) for each diagonal element of $C_i$, a magnitude and phase pair corresponding to a respective transmit antenna.

18. The apparatus of claim 17, wherein the hardware device is configured to determine the plurality of diagonal matrices $C_i$ so that the plurality of diagonal matrices $C_i$ uniformly span a sphere in an $N_T$-dimensional complex space, wherein $N_T$ is the number of transmit antennas in the plurality of transmit antennas.

19. The apparatus of claim 11, wherein the hardware device is configured to use a plurality of stream-to-transmit antenna mapping matrices to modify the plurality of transmit signals.

20. The apparatus of claim 19, wherein the hardware device is configured to:
 combine each stream-to-transmit antenna mapping matrix with a corresponding diagonal matrix $C_i$ to generate a plurality of precoding matrices, and
 use the plurality of precoding matrices to modify the plurality of transmit signals.

* * * * *